US008725293B2

(12) United States Patent
Nagasaka

(10) Patent No.: US 8,725,293 B2
(45) Date of Patent: May 13, 2014

(54) CONTROL DEVICE FOR ROBOT, CONTROL METHOD AND COMPUTER PROGRAM

(75) Inventor: Kenichiro Nagasaka, Tokyo (JP)

(73) Assignee: Sony Corporation, Tokyo (JP)

(*) Notice: Subject to any disclaimer, the term of this patent is extended or adjusted under 35 U.S.C. 154(b) by 246 days.

(21) Appl. No.: 13/236,718

(22) Filed: Sep. 20, 2011

(65) Prior Publication Data
US 2012/0095598 A1    Apr. 19, 2012

(30) Foreign Application Priority Data

Oct. 14, 2010 (JP) ................................ 2010-231640

(51) Int. Cl.
G05B 19/00 (2006.01)

(52) U.S. Cl.
USPC .................. 700/245; 700/260; 901/2; 703/2; 703/6

(58) Field of Classification Search
USPC .......................... 700/245, 260; 901/2; 600/595
See application file for complete search history.

(56) References Cited

U.S. PATENT DOCUMENTS

| 5,303,384 | A  | * | 4/1994  | Rodriguez et al. | 700/264 |
| 5,377,310 | A  | * | 12/1994 | Jain et al. | 700/260 |
| 5,546,508 | A  | * | 8/1996  | Jain et al. | 700/260 |
| 8,140,189 | B2 | * | 3/2012  | Nagasaka | 700/262 |
| 8,489,370 | B2 | * | 7/2013  | Redon et al. | 703/6 |
| 2003/0018455 | A1 | * | 1/2003 | Rosenthal | 703/2 |
| 2005/0209534 | A1 | * | 9/2005 | Dariush | 600/595 |
| 2005/0209535 | A1 | * | 9/2005 | Dariush | 600/595 |
| 2005/0209536 | A1 | * | 9/2005 | Dariush | 600/595 |
| 2007/0083290 | A1 | * | 4/2007 | Nagasaka | 700/245 |
| 2009/0105878 | A1 |   | 4/2009 | Nagasaka | |
| 2009/0272585 | A1 | * | 11/2009 | Nagasaka | 180/8.6 |
| 2010/0005907 | A1 |   | 1/2010 | Kato et al. | |
| 2010/0206651 | A1 | * | 8/2010 | Nagasaka | 180/218 |
| 2012/0095598 | A1 | * | 4/2012 | Nagasaka | 700/260 |

FOREIGN PATENT DOCUMENTS

| JP | 2007-108955 | 4/2007 |
| JP | 2009-95959  | 5/2009 |
| JP | 2009-269102 | 11/2009 |
| JP | 2009-288198 | 12/2009 |
| JP | 2010-188471 | 9/2010 |

OTHER PUBLICATIONS

Luis Sentis, et al., "Control of Free-Floating Humanoid Robots Through Task Prioritization", Proceedings of the 2005 IEEE, International Conference on Robotics and Automation, Apr. 2005, pp. 1718-1723.

(Continued)

Primary Examiner — Thomas Black
Assistant Examiner — Wae Louie
(74) Attorney, Agent, or Firm — Sony Corporation

(57) ABSTRACT

A control device for a robot including: a hybrid dynamics calculator calculating joint forces that act on immovable joints and the joint accelerations that are generated at movable joints by performing a hybrid dynamics calculation that includes inverse dynamics and forward dynamics using an auxiliary model in which the actuated joints of the robot having the actuated joints and the unactuated joints are immovable; a forward dynamics calculator calculating the acceleration that is generated by known force that acts on the robot using a main model; a joint force determination unit determining the joint force; and a joint force controller controlling the joint force of each joint of the robot.

11 Claims, 15 Drawing Sheets

(56) References Cited

OTHER PUBLICATIONS

Oussama Khatib, "A Unified Approach for Motion and Force Control of Robot Manipulators: The Operational Space Formulation", IEEE Journal of Robotics and Automation, vol. RA-3, No. 1, Feb. 1987, pp. 43-53.

Yoji Umetani, et al., "Resolved Motion Rate Control of Space Manipulators with Generalized Jacobian Matrix", IEEE Transactions on Robotics and Automation, vol. 5, No. 3, Jun. 1989, pp. 303-314.

* cited by examiner

UNACTUATED JOINT

OPPOSED-TWO-WHEEL
EQUIVALENT JOINT

PUSH

FINGERTIP IS
IMMOVABLE
WHILE
BALANCE IS
MAINTAINED

CONTROL DEVICE FOR ROBOT, CONTROL METHOD AND COMPUTER PROGRAM

BACKGROUND

The present disclosure relates to a control device for a robot that is configured of link structures, a control method and a computer program, specifically relates to a control device for a robot having unactuated joints where a portion of the joints does not exert a driving force, a control method and a computer program.

An inverted pendulum-type robot or biped walking type robot has superior characteristics in that, since a ground contact area thereof is small, the robot hardly interferes with people when coexisting with people, and the robot able to provide various services to people. Conversely, this type of robot has a problem in which, as the ground contact area is small, in order to perform a task there are strict restraints on external forces that are obtained from the environment. In the inverted pendulum-type robot, a supporting point moment of rotation may not be obtained and in the biped walking type robot, an inequality constraint is added to the moment that is obtained from a road surface according to the shape of the sole of the foot thereof. As a further extreme example, a space robot is exemplified. It is difficult the space robot to obtain absolutely a reaction from the environment. These robots have a portion of the joints being incapable of exerting force and the joints being incapable of modeling as unactuated joints.

An example of joint configuration of the robot having unactuated joints is illustrated in FIG. 11 to 13. FIG. 11 shows a joint configuration example of an inverted pendulum-type robot. The translational movement component of a wheel is expressed as a prismatic joint, and a posture change of the entire robot using a wheel is expressed as a rotational joint continuously connected to the next. Because the entire robot may be rotated freely with a point rotation, the joints are expressed as unactuated joints. The remaining joints are arm joints, and are all actuated joints. In addition, FIG. 12 shows a joint configuration example of a biped walking type robot. The rotational joints of the leg are all actuated joints, and, additional to that, and have six degrees of freedom made up of three translational degrees of freedom and three rotational degrees of freedom, in order that the entire robot may freely express movement in a space. These six degrees of freedom are virtual or theoretical joints, and, as they are non-existent, are not able to exert force. Accordingly, they are expressed as unactuated joints. The biped walking type robot is modeled as a system having unactuated joints with six degrees of freedom, however the whole body may be controlled using a force and a moment obtained from the foot. In addition, FIG. 13 shows a joint configuration example of a space robot. The joints of the robot arm that is mounted on the space robot are expressed as actuated joints. However, the three translational degrees of freedom and the three rotational degrees of freedom of the entire robot are expressed as the six degrees of freedom of the unactuated joints. The space robot, unlike a biped walking type robot, is not able to obtain an external force.

In a link structure, such as in a robot, for example, it is necessary that the joint velocity be obtained, in order to generate a desired speed position of the end of the hand. Otherwise, it is necessary that a joint force be obtained in order to generate a desired acceleration. In a system that is configured only of actuated joints, all the components of joint velocity, or all the components of joint acceleration may be controlled. However, in a system which includes unactuated joints, there is a problem that components of the unactuated joints may not be controlled.

As an important concept in the robot control of the force control system, a space that describes the relation between a force that acts on the robot and a generated acceleration, in other words, an operational space, is exemplified. For example, the position of tip of the hand of the robot is defined as the operational space, and the operational space is used to determine the joint force for generating a desired acceleration at the hand tip. Various methods for precisely controlling the acceleration of the operational space have been suggested (for example, Japanese Unexamined Patent Application Publication Nos. 2009-95959 and 2010-188471), however the object in any of these methods is limited to a case where all the joints are actuated joints.

SUMMARY

It is desirable that an excellent control device for a robot, a control method and a computer program are provided, which are capable of realizing precise control of an acceleration order of the robot which includes unactuated joints.

According to an embodiment of the present disclosure, there is provided a control device for a robot including: a hybrid dynamics calculator calculating joint forces that act on immovable joints where joint accelerations are known and the joint accelerations that are generated at movable joints where the joint forces are known by performing a hybrid dynamics calculation that includes inverse dynamics and forward dynamics using an auxiliary model in which the actuated joints of the robot having actuated joints and unactuated joints are immovable; a forward dynamics calculator calculating the accelerations that are generated by the known forces that act on the robot using a main model in which all joints of the robot are movable; a joint force determination unit determining the joint force for generating desired target acceleration at an arbitrary portion of the robot based on a calculation result from the hybrid dynamics calculator and the forward dynamics calculator; and a joint force controller setting the determined joint force as the control target value and controlling the joint force of each joint of the robot.

In the control device for a robot according to the embodiment of the present disclosure, the force that acts on the robot, which is obtained by the hybrid dynamics calculator is converted to the joint force using a generalized Jacobian.

In the control device for a robot according to the embodiment of the present disclosure, the joint force determination unit including: a generalized operational space inverse inertia matrix calculator obtaining a generalized operational space inverse inertia matrix by repeatedly performing the forward dynamics calculation for all operational spaces by the forward dynamics calculator under conditions where all variables other than a joint space and a external force are 0 and the external force which is formed of one unit vector $e_i$ is acted to only the $i^{th}$ operational space by the $i^{th}$ component; a generalized operational space bias acceleration calculator obtaining a generalized operational space bias acceleration by performing the forward dynamics calculation by the forward dynamics calculator only once under a constraint in which only the speed and gravity that are generated at the joint spacesact; a virtual external force calculation unit resolving a virtual external force f that is exerted in the operational space in order to obtain the target acceleration that is known and generated in the operational space in a relation expression of the force and the acceleration that act in the operational space that is expressed using the generalized operational space inverse inertia matrix and the generalized operational space bias acceleration; and a joint calculation unit converting the external force f that is obtained by the virtual external force calculation unit to the actuated joint force of the actuated joints using a generalized inverse force dynamics calculation.

In the control device for a robot according to the embodiment of the present disclosure, the virtual external force calculation unit obtains the virtual external force satisfying a linear complementary problem that is configured of the constraint formed between the relation expression, the robot and the environment using the generalized operational space inverse inertia matrix and the generalized operational space bias acceleration calculator and then determines the joint force of the links based on the obtained force.

In the control device for a robot according to the embodiment of the present disclosure, the generalized Jacobian is obtained by repeatedly performing the hybrid dynamics calculation that calculates a joint force of an actuated joint space by the hybrid dynamics calculator under conditions where all variables other than a joint space and an external force are 0 and the external force which is formed of one unit vector ei is acted to only the $i^{th}$ operational space.

According to another embodiment of the present disclosure, there is provided a control method of a robot including: performing a hybrid dynamics calculation that calculates joint forces acting on immovable joints where joint accelerations are known and the joint acceleration that are generated at movable joints where the joint forces are known by performing a hybrid dynamics calculation that includes inverse dynamics and forward dynamics using an auxiliary model in which the actuated joints of the robot having the actuated joints and the unactuated joints are immovable; calculating forward dynamics that calculates the accelerations generated by the forces that are known and effected to the robot using a main model in which all joints of the robot are movable; determining the joint force for generating desired target acceleration at an arbitrary portion of the robot based on a calculation result from the calculating t joint forces and the acceleration; and setting the determined joint force as the control target value and controlling a joint force of each joint of the robot.

According to still another embodiment of the present disclosure, there is provided a computer program that is recorded in a computer readable format, which performs a process for controlling a robot having actuated joints and unactuated joints on the computer, the computer functioning as, a hybrid dynamics calculator calculating joint forces that act on immovable joints where joint acceleration is known and the joint accelerations that are generated at movable joints where the joint force is known by performing a hybrid dynamics calculation that includes inverse dynamics and forward dynamics using an auxiliary model in which the actuated joints of the robot are immovable; a forward dynamics calculator calculating the acceleration that is generated by known force that acts on the robot using a main model in which all joints of the robot are movable; a joint force determination unit determining the joint force for generating desired target acceleration at an arbitrary portion of the robot based on a calculation result from the hybrid dynamics calculator and the forward dynamics calculator; and a joint force controller setting the determined joint force as the control target value and controlling the joint force of each joint of the robot.

The computer program according to the above description is defined as a computer program that is recorded in readable format on a computer so as to realize a predetermined process on the computer. In other words, the computer program according to the above description is installed on the computer so that a cooperated effect is exerted on the computer and is capable of obtaining the same advantage as the control device for a robot according to the above description.

According to the disclosure, it is possible to obtain precise control of the robot including unactuated joints in an acceleration order with a small calculation amount that is O(N) with respect to the number of joints N. Thus, the excellent control device for a robot, the control method and the computer program can be provided.

Further objects, features and advantages of the disclosure will become clear from the detailed description based on following embodiments and attached drawings of the disclosure.

DETAILED DESCRIPTION OF EMBODIMENTS

Hereinafter, embodiments of the disclosure are described with reference to drawings.

Figure 11:
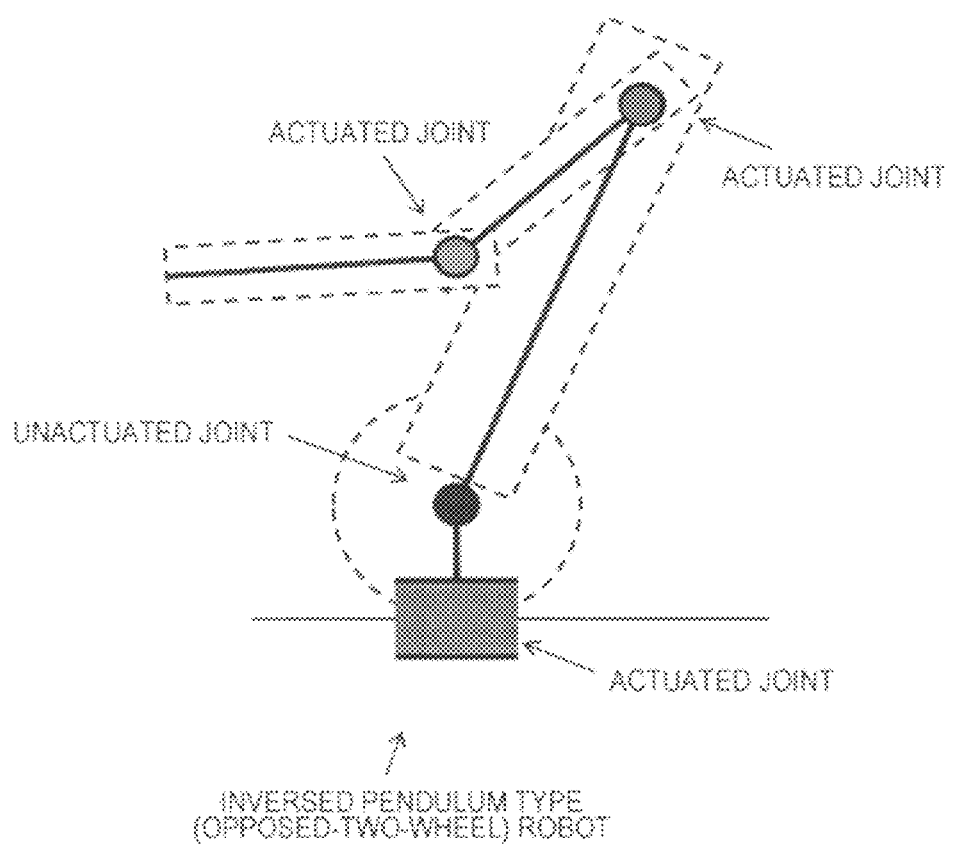
FIG. 11 is a drawing illustrating a joint configuration of an inverted pendulum-type robot.
Figure 12:
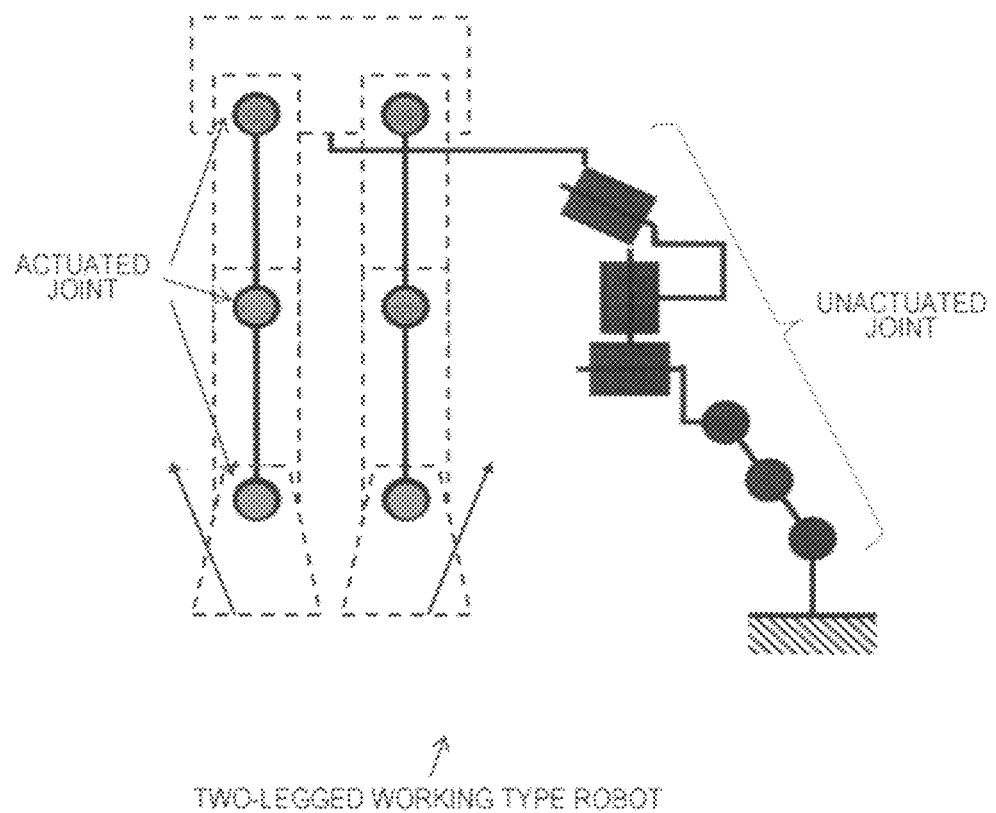
FIG. 12 is a drawing illustrating a joint configuration example of a biped walking type robot.
Figure 13:
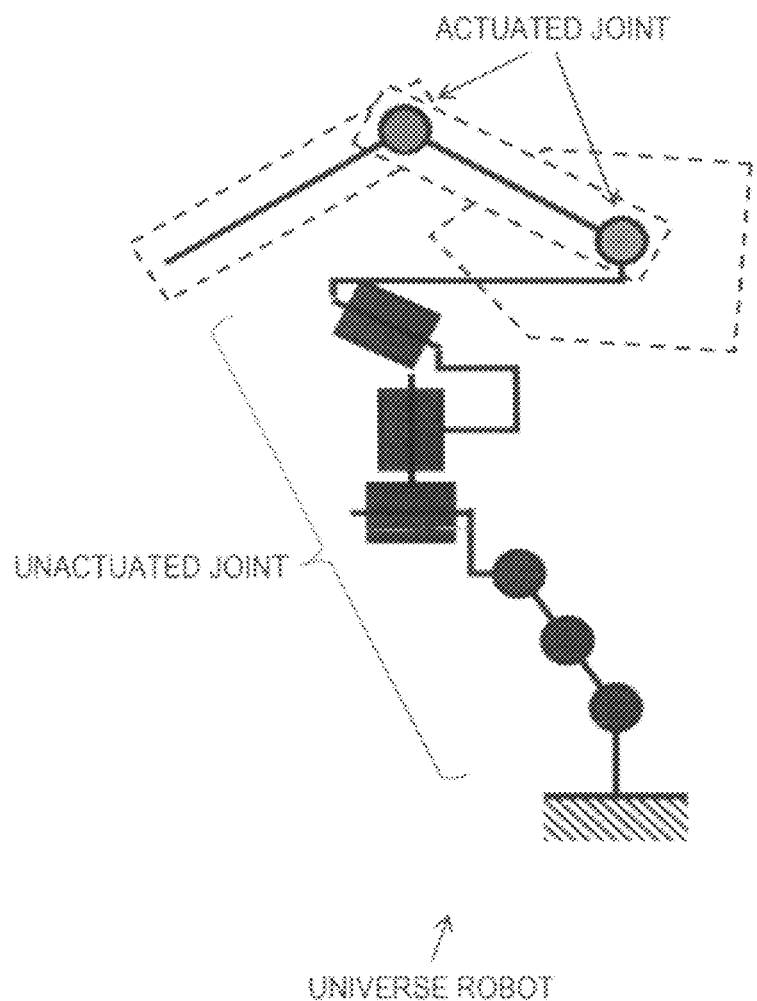
FIG. 13 is a drawing illustrating a joint configuration example of a space robot.

The robot is generally a link structure configured of a plurality of rigid bodies that are connected to each other. In an inverted pendulum-type robot, a biped walking type robot, a space robot or the like, a portion of the joints are not capable of exerting a force and are capable of being modeled as unactuated joints (refer to the above description and FIGS. 11 to 13). In the link structure of the robot or the like, for example, a joint velocity has to be obtained in order to generate a desired speed at the tip of the hand. Otherwise, a joint force is has to be obtained in order to generate a desired acceleration. In a system that is configured only of actuated joints, all components of the joint velocity or all components of the joint acceleration may be directly controlled. However, in a system that includes unactuated joints, there is a problem that the components of the unactuated joints may not be controlled directly.

Here, an equation for the motion of the robot is generally expressed as the following expression (1)

$$H\ddot{q} + b = \tau + J^T f \quad (1)$$

In the above expression (1), q is a joint space, τ is a force that is generated at the joint space q, b is a gravity or Coriolis force, H is an inertia matrix with respect to the joint space of the robot (whole link structure), f is an external force and J is a Jacobian that expresses a space in which the external force f acts. Herein below, a joint that connects the $i^{th}$ link of the robot and a parent link thereof is the $i^{th}$ joint.

When the above expression (1) is expressed divided into the actuated joint component and unactuated joint component, it is expressed by the following expression (2).

$$\begin{bmatrix} H_{UU} & H_{UA} \\ H_{AU} & H_{AA} \end{bmatrix} \begin{bmatrix} \ddot{q}_U \\ \ddot{q}_A \end{bmatrix} + \begin{bmatrix} b_U \\ b_A \end{bmatrix} = \begin{bmatrix} \tau_U \\ \tau_A \end{bmatrix} + \begin{bmatrix} J_U^T \\ J_A^T \end{bmatrix} f \quad (2)$$

In the above expression (2), an index A expresses actuated joint component and an index U expresses the unactuated joint component respectively. The robot having unactuated joints means a robot where the joint force of the unactuated joints $q_U$ is usually 0, in other words, $\tau_U = 0$ in the expression (2).

As an important concept in a case where the robot having the unactuated joint is controlled, there is a generalized Jacobian (for example, refer to, Y. Umetami and K. Yoshida, "Resolved motion rate control of space manipulators with generalized Jacobin matrix" (In IEEE Transactions on Robotics and Automation, 5(3), June 1989)). The generalized Jacobian $J_G$ is given in the following expression (3).

$$J_G = J_A - J_U H_{UU}^{-1} H_{UA} \quad (3)$$

As an important concept in robot control of the force control system, there is an operational space that describes the relation between the force that acts on the robot and an acceleration that is generated (described above). For example, the position of tip of the hand of the robot is defined as the operational space and then the operational space is used to determine the joint force that generates the desired acceleration for the tip of the hand. Usually, the speed of the operational space x is expressed as the following expression (4) using the joint velocity of the joint q and the Jacobian J.

$$\dot{x} = J\dot{q} = J_A \dot{q}_A + J_U \dot{q}_U \quad (4)$$

For example, the joint velocity for generating the desired speed in the operational space x may be obtained from the following expression (5). In the expression, $J^\#$ is a pseudo-inverse matrix of the Jacobian J.

$$\dot{q} = J^\# \dot{x} \quad (5)$$

The relation expressed in the above expression (5) is used with a method of repetition, such as a Newton-Raphson method, so that it is also configurable as, so-called, an inverse kinematics calculation. In a system having only actuated joints, since all speed components of the joint space q may be controlled, and the above relational expression (5) is effective. Meanwhile, in a system including unactuated joints, since an unactuated joint component in the speed components of the joint space q may not be controlled, the relation expression (5) may not be applied. However, on the assumption that the total momentum amount of the system is preserved at zero, the following relational expression (6) is established.

$$\dot{x} = J_G \dot{q}_A \quad (6)$$

When the above expression (6) is used, inverse kinematics of a space robot or the like may be configured, where the momentum is preserved at 0. However, the relational expression (6) includes an inertia matrix H if the definition expression (3) of a generalized Jacobian $J_G$ is used as is. In a system where the number of joints is N, the size of an inverse inertia matrix H is N×N and the calculation amount for obtaining the inertia matrix H is increased. Also, the relation expression (6) is not established and only a speed level control unit is supplied if the total momentum is not preserved. In other words, based on the relation expression (6), precise control is difficult to realize in an acceleration order in the case where the momentum is not preserved or in the system that has the unactuated joints.

In addition, a method that controls a force generated in the operational space of a system of a Floating Base including the unactuated joint is also suggested (for example, refer to Luis Sentis and Oussama Khatib, "Control of Free-Floating Humanoid Robots Through Task Prioritization" (Proceedings of the IEEE International Conference in Robotics and Automation Barcelona, Spain, April 2005)). However, the above described generalized Jacobian $J_G$ or a Null Space thereof has to be obtained and the calculation amount is large.

In addition, methods for controlling precisely the acceleration of the operational space are suggested variously (for example, refer to the above description, related Japanese Unexamined Patent Application Publication Nos. 2009-95959 and 2010-188471), however, even in the methods, the object is limited to a case where all the joints are actuated joints.

Thus, herein below, a description is given regarding a method where a precise control of the robot including the unactuated joints in acceleration order is obtained with a small calculation amount as O(N) with respect to the joint number N.

In order to consider the motion by an internal force, a system where the external force term is excluded from the motion equation (2) described above is considered. The following expressions (7-1) and (7-2) may be obtained by the upper equation and the lower equation of the above expression (2) respectively.

$$\ddot{q}_U = H_{UU}^{-1}(\tau_U - H_{UA}\ddot{q}_A - b_U) \quad (7\text{-}1)$$

$$\ddot{q}_A = H_{AA}^{-1}(\tau_A - H_{AU}\ddot{q}_U - b_A) \quad (7\text{-}2)$$

When the lower equation of the above expression (2) is substituted for the above expression (7-1), a motion equation (8) regarding an actuated joint space $q_A$ may be obtained as described below.

$$(H_{AA} - H_{AU}H_{UU}^{-1}H_{UA})\ddot{q}_A + (b_A - H_{AU}H_{UU}^{-1}b_U) + H_{AU}H_{UU}^{-1}\tau_U = \tau_A \quad (8)$$

Similarly, when the upper equation of the above expression (2) is substituted for the above expression (7-2), a motion equation (9) regarding an unactuated joint space $q_U$ may be obtained as described below.

$$(H_{UU} - H_{UA}H_{AA}^{-1}H_{AU})\ddot{q}_A + (b_U - H_{UA}H_{AA}^{-1}b_A) + H_{UA}H_{AA}^{-1}\tau_A = \tau_U \quad (9)$$

Meanwhile, the expression (4) that expresses the relation between the speed of the operational space x and the joint velocity of the joint space q is differentiated and then the acceleration that is generated in the operational space x may be obtained as expressed in the following expression (10).

$$\ddot{x} = J_U\ddot{q}_U + \dot{J}_U\dot{q}_U + J_A\ddot{q}_A + \dot{J}_A\dot{q}_A \quad (10)$$

When the above expression (10) is substituted for the above expression (7-1), the acceleration that is generated in the operational space x may be expressed in the joint acceleration of the actuated joint space $q_A$.

$$\ddot{x} = J_G\ddot{q}_A + J_U H_{UU}^{-1}(\tau_U - b_U) + \dot{J}_U\dot{q}_U + \dot{J}_A\dot{q}_A \quad (11)$$

When the acceleration of the actuated joint space $q_A$ is erased from the above expression (11) using the motion equation (8) regarding the above-described actuated joint space $q_A$, the acceleration that is generated in the operational space x may be expressed as the joint forces $\tau_A$ and $\tau_U$ that are generated at the actuated joint space $q_A$ and an unactuated joint space $q_U$ respectively as described in the following expression (12).

$$\ddot{x} = J_G H_G^{-1}\{\tau_A - (b_A - H_{AU}H_{UU}^{-1}b_U) - H_{AU}H_{UU}^{-1}\tau_U\} + \{J_U H_{UU}^{-1}(\tau_U - b_U) + \dot{J}_U\dot{q}_U + \dot{J}_A\dot{q}_A\} \quad (12)$$

However, $H_G$ is a generalized inertia matrix and is expressed as the following expression (13). Regarding the generalized inertia matrix, for example, refer to Y. Xu and T. Kanade, "Space Robotics: Dynamics and Control" (Prentice Hall, 1992).

$$H_G = H_{AA} - H_{AU}H_{UU}^{-1}H_{UA} \quad (13)$$

A virtual external force f is considered with respect to the operational space x, and then a joint force t that is configured of the joint force $\tau_A$ of the actuated joint space $q_A$ and the joint force $\tau_U$ of a unactuated joint space $q_U$ are generated as described in the following expression (14) (the calculation obtaining $\tau$ from the f is referred to as "Inverse Force Kinematics").

$$\tau = \begin{bmatrix} \tau_U \\ \tau_A \end{bmatrix} = \begin{bmatrix} J_U^T \\ J_A^T \end{bmatrix} f \quad (14)$$

At this time, the acceleration that is generated in the operational space x, which is expressed in the above expression (12) may be expressed as the external force f as described in the following expression (15).

$$\ddot{x} = (J_G H_G^{-1}J_G^T + J_U H_{UU}^{-1}J_U^T)f + \dot{J}_U\dot{q}_U + \dot{J}_A\dot{q}_A - J_U H_{UU}^{-1}b_U - J_G H_G^{-1}(b_A - H_{AU}H_{UU}^{-1}b_U) \quad (15)$$

Here, a coefficient matrix of the external force f is $\Lambda^{-1}$ as described in the following expression (16). The coefficient matrix $\Lambda^{-1}$ is known as an operational space inverse inertia matrix. Regarding the operational space inverse inertia matrix $\Lambda^{-1}$, for example, refer to O. Khatib, "A Unified Approach to Motion and Force Control of Robot Manipulators: The Operational Space Formulation" (In IEEE J. on Robotics and Automation, vol. 3, no. 1, 1987, pp. 43-53).

$$\Lambda^{-1} = JH^{-1}J^T = (J_G H_G^{-1}H_G^T + J_U H_{UU}^{-1}J_U^T) \quad (16)$$

In the above expression (16), an inverse matrix $H^{-1}$ of the inertia matrix H is a positive definite symmetric matrix, so that $JH^{-1}J^T$, in other words, even the operational space inverse inertia matrix $\Lambda^{-1}$ is also the positive definite symmetric matrix. The operational space inverse inertia matrix $\Lambda^{-1}$ that is the positive definite symmetric matrix may be solved as a linear complementary problem (LCP) on the numerical calculation. For example, external force f may be stably obtained in order to realize a target value of the acceleration that is generated in the operational space x.

Meanwhile, if an unactuated joint $q_U$ is present in the robot that is the object of the control, the joint force $\tau_U$ of an unactuated joint $q_U$ may not be generated in the above expression (14). In addition, in the above expression (14), $\tau_U=0$ (the joint force of an unactuated joint $q_U$ is 0 most of the time.) so that the acceleration that is generated in the operational space x is as in the following expression (17) and the coefficient matrix $J_G H_G^{-1}J_A^T$ of the external force f does not become the positive definite symmetric matrix. In other words, the coefficient matrix of the external force f is difficult to solve using the numerical calculation and then the external force f that is used to realize the target value of the acceleration that is generated in the operational space x may not be stably obtained.

$$\ddot{x} = J_G H_G^{-1}J_A^T f + \dot{J}_U\dot{q}_U + \dot{J}_A\dot{q}_A - J_U H_{UU}^{-1}b_U - J_G H_G^{-1}(b_A - H_{AU}H_{UU}^{-1}b_U) \quad (17)$$

However, if the joint force $\tau$ that is generated by the virtual external force f is expressed as the following expression (18) instead of the above expression (14), the acceleration that is generated in the operational space x is expressed as the following expression (19). As expressed in the following expression (18), the calculation that obtains the joint force $\tau_A$ of the actuated joint space $q_A$ from the external force f is referred to as "Generalized Inverse Force Kinematics" in below.

$$\tau = \begin{bmatrix} \tau_U \\ \tau_A \end{bmatrix} = \begin{bmatrix} 0 \\ J_G^T f \end{bmatrix} \quad (18)$$

$$\ddot{x} = J_G H_G^{-1}J_G^T f + \dot{J}_U\dot{q}_U + \dot{J}_A\dot{q}_A - J_U H_{UU}^{-1}b_U - J_G H_G^{-1}(b_A - H_{AU}H_{UU}^{-1}b_U) \quad (19)$$

In the above expression (19), the coefficient matrix $J_G H_G^{-1}J_G^T$ of the external force f is a semi positive definite symmetric matrix. When the generalized Jacobian $J_G$ falls in rank, all inherent values may be 0, and in other cases, the solution method as the positive definite symmetric matrix may be used.

When the above description is summarized, the motion equation of the robot that is expressed by the above expression (1) may be modified as expressed in the following expression (20) that expresses dynamics regarding the operational space x.

$$\ddot{x} = \Lambda_G^{-1} f + c_G \quad (20)$$

The above expression (20) expresses the relation between f and the acceleration that is generated in the operational space x when the external force f that is defined in the above expression (18) acts in the operational space x. The coefficient matrix $\Lambda_G^{-1}$ of the external force f in the above expression (20) is referred to "generalized operational space inverse inertia matrix". In addition, a constant term $c_G$ in the right side of the above expression (20) is referred to "generalized operational space bias acceleration". The generalized operational space inverse inertia matrix $\Lambda_G^{-1}$ and the generalized operational space bias acceleration $c_G$ are expressed as the following expressions (21) and (22) respectively.

$$\Lambda_G^{-1} = J_G H_G^{-1} J_G^T \tag{21}$$

$$c_G = \dot{J}_U \dot{q}_U + \dot{J}_A \dot{q}_A - J_U^H U_U^{-1} b_U - J_G H_G^{-1} (b_A - H_{AU} H_{UU}^{-1} b_U) \tag{22}$$

When the generalized operational space inverse inertia matrix $\Lambda_G^{-1}$ and the generalized operational space bias acceleration $c_G$ are obtained, the external force f (in other words, the joint force $\tau_A$ of the actuated joint space $q_A$ that is converted from the external force f using the above expression (20)) that is a control input in order to generate the target acceleration in the operational space x by the above expression (20) may be determined.

For example, Japanese Unexamined Patent Application Publication No. 2007-108955, which has been granted to the applicant, discloses a calculating method of the operational space inverse inertia matrix and the operational space bias acceleration with a high speed and low calculation load using the linear complementary problem (LCP) solver or the like.

However, when the generalized operational space inverse inertia matrix $\Lambda_G^{-1}$ and the generalized operational space bias acceleration $c_G$ are obtained according to the above definition expressions (21) and (22) respectively, the calculation amount is increased. First, the inertia matrix H has to be obtained in order to obtain the generalized inertia matrix $H_G$. In the system where the joint number is N, the size of the inertia matrix H is N×N and the calculation cost becomes $O(N^2)$ on the basis of the joint number N. Accordingly, when the inversion cost is considered, in order to obtain the generalized inertia matrix $H_G$, the calculation cost of $O(N^3)$ with respect to the joint number N is taken so that the calculation amount increases rapidly as the joint number being increased.

Regarding a method of obtaining the generalized operational space inverse inertia matrix $\Lambda_G^{-1}$ and the generalized operational space bias acceleration $c_G$ with smaller calculation amount, a method is considered as described below. In the above expression (20), in the calculation obtaining the left side from the right side, a problem of obtaining the acceleration in the operational space x when and external force or gravity, and a force related to the speed product (the Coriolis force or the like) act can be seen. The calculation to obtain the acceleration in the operational space x is different from the usual forward dynamics, however it may be taken as a type of forward dynamics calculation. The forward dynamics calculation $FD_G$ may be expressed as the following expression (23) with parameters of the external force f, gravity g, the joint velocity and the joint space q as the kinematics model of the link structure.

$$\ddot{x} = FD_G(q, \dot{q}, g, f) \tag{23}$$

According to the forward dynamics calculation $FD_G$, the acceleration that is generated at each point of the link structure may be obtained from the force information that acts on the link structures such as the joint space q, gravity g and external force f.

Here, in the above expression (23), under the constraint where all input parameters of the forward dynamics calculation $FD_G$ other than the joint space q and external force f are 0, the acceleration that is generated in the operational space x may be obtained in a situation where gravity, the joint force and the force that is related to the speed product (the Coriolis force or the like) are not generated. In other words, in the expression (22), the generalized operational space bias acceleration $c_G$=0 may be established. Furthermore, under a control where f=$e_i$, in other words, the $i^{th}$ component acts on one unit vector $e_i$ at the $i^{th}$ operational space, when the calculation of the expression (23) is performed, the $i^{th}$ column of the generalized operational space inverse inertia matrix $\Lambda_G^{-1}$ may be obtained. Accordingly, if the calculation of the following expression (24), which represents the $i^{th}$ column of matrix $\Lambda_G^{-1}$, is performed regarding all columns i, the entire operational space inverse inertia matrix $\Lambda_G^{-1}$ may be obtained.

$$\Lambda_G^{-1} = FD_G(q, 0, 0, e_i) \tag{24}$$

Under the constraint where the external force f=0 and only the speed and gravity g of the input parameters of the forward dynamics calculation $FD_G$ that are generated at the joint space q act, the forward dynamics calculation $FD_G$ of the above expression (24) is performed so that the generalized operational space bias acceleration $c_G$ may be calculated as expressed in the following expression (25).

$$c_G = FD_G(q, \dot{q}, g, 0) \tag{25}$$

Initially, the configuration method of the forward dynamics calculation is general method of using the inverse kinematics calculation (the calculation where the force is obtained from the acceleration), however, there is a problem in that the calculation amount increases when the calculation has a calculation amount of $O(N^3)$ and the number of degrees of freedom increases. For the problem, the above-described Japanese Unexamined Patent Application Publication No. 2007-108955 or R. Featherstone, "Robot Dynamics Algorithms" (Kluwer Academic Publishers, 1987) discloses a method that configures the forward dynamics calculation in a computational complexity of $O(N)$ using an Articulated Body method (herein below, refer to "an AB method"). In addition, regarding the AB method itself, the method is for example, described in "The calculation of robot dynamics using articulated-body inertias" (Int. J. Robotics Research, vol. 2, no. 1, pp. 13-30, 1983). In the configuration method of the forward dynamics calculation disclosed in Japanese Unexamined Patent Application Publication No. 2007-108955, the AB method is broken down into four, an inertia information calculation, a speed information calculation, a force information calculation and an acceleration information calculation.

If above-described forward dynamics calculation expression (23) may be realized by the computational complexity of $O(N)$ the same as the AB method, the generalized operational space inverse inertia matrix $\Lambda_G^{-1}$ and the generalized operational space bias acceleration $c_G$ may be calculated with the same computational complexity according to the above expressions (24) and (25).

The difference of the forward dynamics calculation expression (23) from the process of the usual AB method is the joint force τ that is generated by the external force f is not generated by the above expression (14) but the above expression (18). If the generalized Jacobian $J_G$ is calculated according to the above definition expression (3), the calculation is output through the calculation of the inertia matrix H and the calculation amount of $O(N^2)$ is present so that the effectiveness thereof is worse.

When the above motion equation (2) is rewritten in another form, the following expression (26) is expressed.

$$\begin{bmatrix} H_{UU}^{-1} & H_{UU}^{-1}H_{UA} \\ H_{AU}H_{UU}^{-1}H_{AA} & H_{AA} - H_{AU}H_{UU}^{-1}H_{UA} \end{bmatrix} \quad (26)$$

$$\begin{bmatrix} \tau_U \\ \ddot{q}_A \end{bmatrix} + \begin{bmatrix} H_{UU}^{-1}J_U^T f \\ (H_{AU}H_{UU}^{-1}J_U^T - J_A^T)f \end{bmatrix} + \begin{bmatrix} H_{UU}^{-1}b_U \\ b_A - H_{AU}H_{UU}^{-1}b_U \end{bmatrix} = \begin{bmatrix} \ddot{q}_U \\ \tau_A \end{bmatrix}$$

In other words, the calculation where the right side is obtained from the left side of the above expression (26) may be written as the following expression (27).

$$\begin{bmatrix} \ddot{q}_U \\ \tau_A \end{bmatrix} = HD(q, \dot{q}, \tau_U, \ddot{q}_A, f, g) \quad (27)$$

The calculation that is expressed in the above expression (27) is a mixed calculation of the inverse kinematics that obtains the effective force from the acceleration and the forward dynamics that obtains the acceleration that is generated when the force effects, and is referred to "hybrid dynamics (HD)". Regarding the hybrid dynamics, for example, refer to R. Featherstone, "Robot Dynamics Algorithms" (Kluwer Academic Publishers, 1987) (described above). Specifically, "1. the joint force is not generated at an unactuated joint $q_U$ (the joint force $\tau_U$ of the unactuated joint $q_U$ is known)", "2. the actuated joint $q_A$ is not moved (the acceleration of the actuated joint $q_A$ is known)" and "3. the speed of the joints q are all 0 and gravity does not act", in other words, when the auxiliary model that is expressed in the following expression (28-1) is considered, it can be understood that the following expression (28-2) is established.

1. $\tau_U = 0$ (28-1)
2. $\ddot{q}_A = 0$
3. $b_A = b_U = 0$ $$\begin{bmatrix} \ddot{q}_U \\ \tau_A \end{bmatrix} = HD(q, 0, 0, 0, f, 0) = \begin{bmatrix} H_{UU}^{-1}J^T f \\ -J_G^T f \end{bmatrix} \quad (28-2)$$

The above expression (28-2) performs a sign inversion of the actuated joint force $\tau_A$ that is obtained as the result of the hybrid dynamics calculation of the auxiliary model that is expressed in the above expression (28-1) and it means that it is according to the actuated joint force $\tau_A$ that is obtained as the result of generalized inverse force kinematics, in other words, in the above expression (18). The actuated joint force $\tau_A$ that is obtained as described above with respect to the external force f acts and then the forward dynamics calculation that is disclosed in above-described Japanese Unexamined Patent Application Publication No. 2007-108955 is performed so that the above-described forward dynamics calculation expression (23) regarding the operational space x that is defined in the generalized Jacobian $J_G$ may be realized. Specifically, the hybrid dynamics calculation is broken down into four processes of the inertia information calculation, the speed information calculation, the force information calculation and the acceleration information calculation that are modified from the AB method and may be performed with the calculation amount of O(N) by the calculation as described below respectively. Accordingly, the entire forward dynamics calculation expression (23) regarding the operational space x that is defined in the generalized Jacobian $J_G$ may also be obtained with the calculation amount of O(N).

Figure 14:
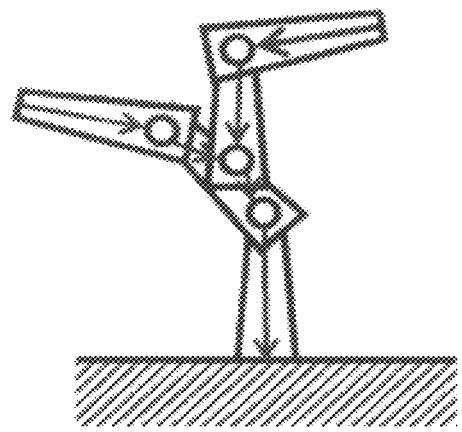
FIG. 14 is a drawing illustrating the usual passage where information is calculated in order from the end to the bottom in the multi-link structure device that is provided at the bottom surface.

Inertia Information Calculation:

The inertia information is obtained $I_i^A$ (articulated body inertia) of whole links by performing the following expression (29) from the end of the robot device to the bottom. A usual passage (backward propagation) where the information is calculated in the order from the end to the bottom in the multi-link structure that is provided at the bottom surface is shown in FIG. 14.

$$I_i^A = I_i + \Sigma_{j \in C_F(i)}\{I_j^A - I_j^A S_j (S_j^T I_j^A S_j)^{-1} S_j^T I_j^A\} + \Sigma_{j \in C_A(i)} I_j^A \quad (29)$$

In the above expression (29), $I_i$ is the inertia of the link i, $C_F(i)$ is an index set of child links of the known joint force of the link i, $C_A(i)$ is an index set of child links of the known acceleration of the link i. In addition, $S_i$ is a matrix that expresses the degrees of freedom of the motion of the joint of the link i.

Figure 15:
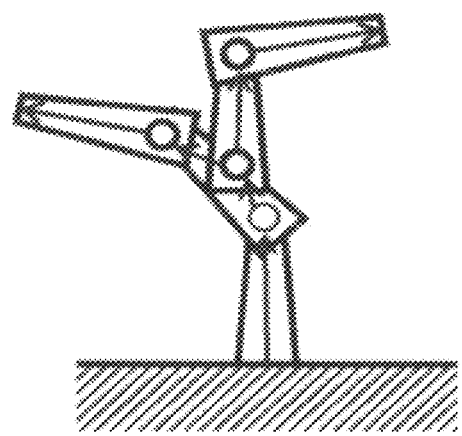
FIG. 15 is a drawing illustrating a usual passage where speed information is calculated in order from the bottom to the end in the multi-link structure device that is provided at the bottom surface.

Speed Information Calculation:

The speed information obtains the speed of original points of whole links by performing the following expression (30) from the bottom to the end of the robot. A usual passage (forward propagation) where the speed information is calculated from the bottom to the end at the device of the multi-link structure that is arranged at the bottom surface is illustrated in FIG. 15.

$$v_i = v_p + S_i \dot{q}_i \quad (30)$$

In the above expression (30), $v_i$ is the speed of the link i and p is the index of the parent link. In addition, $q_i$ is the joint space of the link i.

Force Information Calculation:

The force information obtains a bias force $p_i^A$ of all links by performing the following expressions (31) to (32) from the end to the bottom of the robot (see FIG. 14).

$$p_i^A = v_i \times I_i v_i - \sum_{k \in F(i)} f_k + \sum_{j \in C(i)} \{p_j + I_j^A S_j (S_j^T I_j^A S_j)^{-1} (\tau_j - S_j^T p_j)\} \quad (31)$$

$$p_i = p_i^A + I_i^A S_i \dot{q}_i \quad (32)$$

In the above expression (31), $f_k$ is the $k^{th}$ external force in the link i, F(i) is an index set of the external force that effects at the link i and $\tau_i$ is the joint force of the link i.

Acceleration Information Calculation:

The acceleration information obtains the acceleration $a_i$ of whole links according to performing the following expressions (33) to (35) from the bottom to the end (see FIG. 15). When the joint of the link i is an unactuated joint, the following expressions (33) and (34) are performed and when the joint of the link i is an actuated joint, the following expression (35) is performed.

When the joint force of the link i is known:

$$\ddot{q}_i = (S_i^T I_i^A S_i)^{-1} \{\tau_i - S_i^T (I_i^A a_p + p_i)\} \quad (33)$$

$$a_i = a_p + \dot{S}_i \dot{q}_i + S_i \ddot{q}_i \quad (34)$$

When the acceleration of the link i is known:

$$\tau_i = S_i^T (I_i^A a_i + p_i) \quad (35)$$

In above-described calculation, the speed of the bottom that is the original point of the speed information calculation $v_0 = 0$. In addition, the advantage of gravity is considered to be that the bottom is raised in the gravitational acceleration at the acceleration information calculation.

$$a_0 = g \quad (36)$$

The above-described calculation is performed in the order of the inertia information calculation→ the speed information calculation→ the force information calculation→ the acceleration information calculation so that the hybrid dynamics calculation may be effectively performed. Furthermore, the generalized operational space inverse inertia matrix $\Lambda_G^{-1}$ and the generalized operational space bias acceleration $c_G$ may be effectively calculated, the joint force may be determined in order to generate desired acceleration at any location of the link structure and the acceleration may be precisely operated at any location of the link structure even in the robot that has unactuated joint.

When x is considered as a variable that summarizes all operational spaces, all constraints may be described as linear constraint expressions (37) and (38) including inequality expression as described below.

$$w + \ddot{x} = \Lambda_G^{-1} f + c \quad (37)$$

$$\text{s.t.} \begin{cases} ((w_i < 0) \wedge (f_i = U_i)) \vee \\ ((w_i > 0) \wedge (f_i = L_i)) \vee \\ ((w_i = 0) \wedge (L_i < f_i < U_i)) \end{cases} \quad (38)$$

Here, w is a type of slack variable. In addition, $L_i$ and $U_i$ in the above expression (38) are the lower limit and the upper limit of a virtual force $f_i$ that are acted at the $i^{th}$ operational space respectively.

The above expressions (37) to (38) are the linear complementary problems. Thus, when the generalized operational space inverse inertia matrix $\Lambda_G^{-1}$ and the generalized operational space bias acceleration $c_G$ are known, the linear complementary problem is solved so that the virtual external force f may be determined, which generates the target acceleration in the operational space x where the leaner constraint is satisfied. Mathematical solution itself of the linear complementary problem is for example, disclosed in "Fast Contact Force Computation for Nonpenetrating Rigid Bodies" (SIGGRAPH94, pp. 23-34, 1994) and thus the description thereof is omitted in the specification.

In many cases where the force f for generating the target acceleration of the operational space x is obtained as the linear complementary problem, the most of calculations are conducted in the portion where the generalized operational space inverse inertia matrix $\Lambda_G^{-1}$ is obtained. As described above, according to the embodiment, the generalized operational space inverse inertia matrix $\Lambda_G^{-1}$ may be calculated at high speed so that the process may be performed in real time at the real machine of the robot. When force f is obtained as described above, the joint force τ that satisfies the constraint expressions (37) to (38) may be determined based on the above expression (18).

Figure 1:
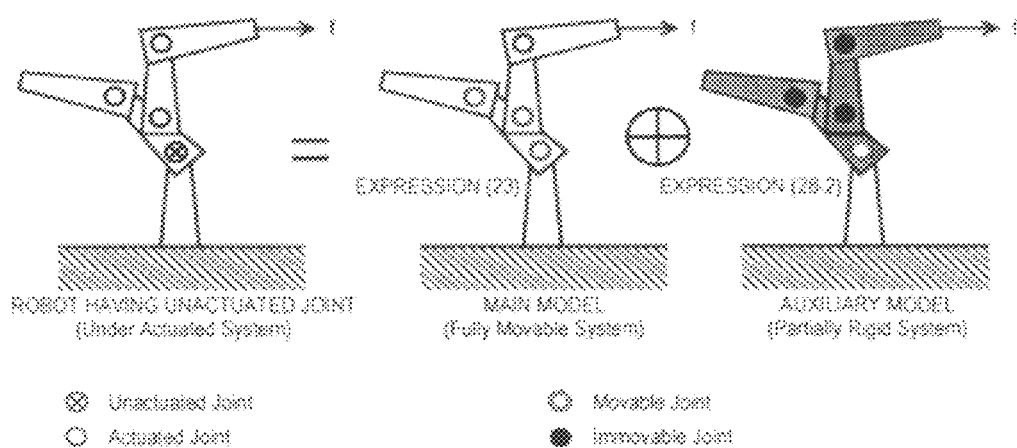
FIG. 1 is a drawing illustrating a robot having unactuated joints as two models that are a robot model in which all shafts are movable and an auxiliary model in which actuated joints are immovable and unactuated joints are movable.

When above description is summarized, as shown in FIG. 1, the robot having unactuated joints (under an actuated system) may be expressed by two model sets of (1) a main model (fully movable system) of the robot where all joints are movable joints, (2) an auxiliary model (partially rigid system) where the actuated joint is an immovable joint and the unactuated joint is a movable joint. Thus, usual forward dynamics calculation (see the above expression (23)) is performed in the main model and the hybrid dynamics calculation (see the above expression (28-2)) is performed in the auxiliary model so that the operational space physical amount of the entire system is effectively obtained and controlled.

Figure 2:
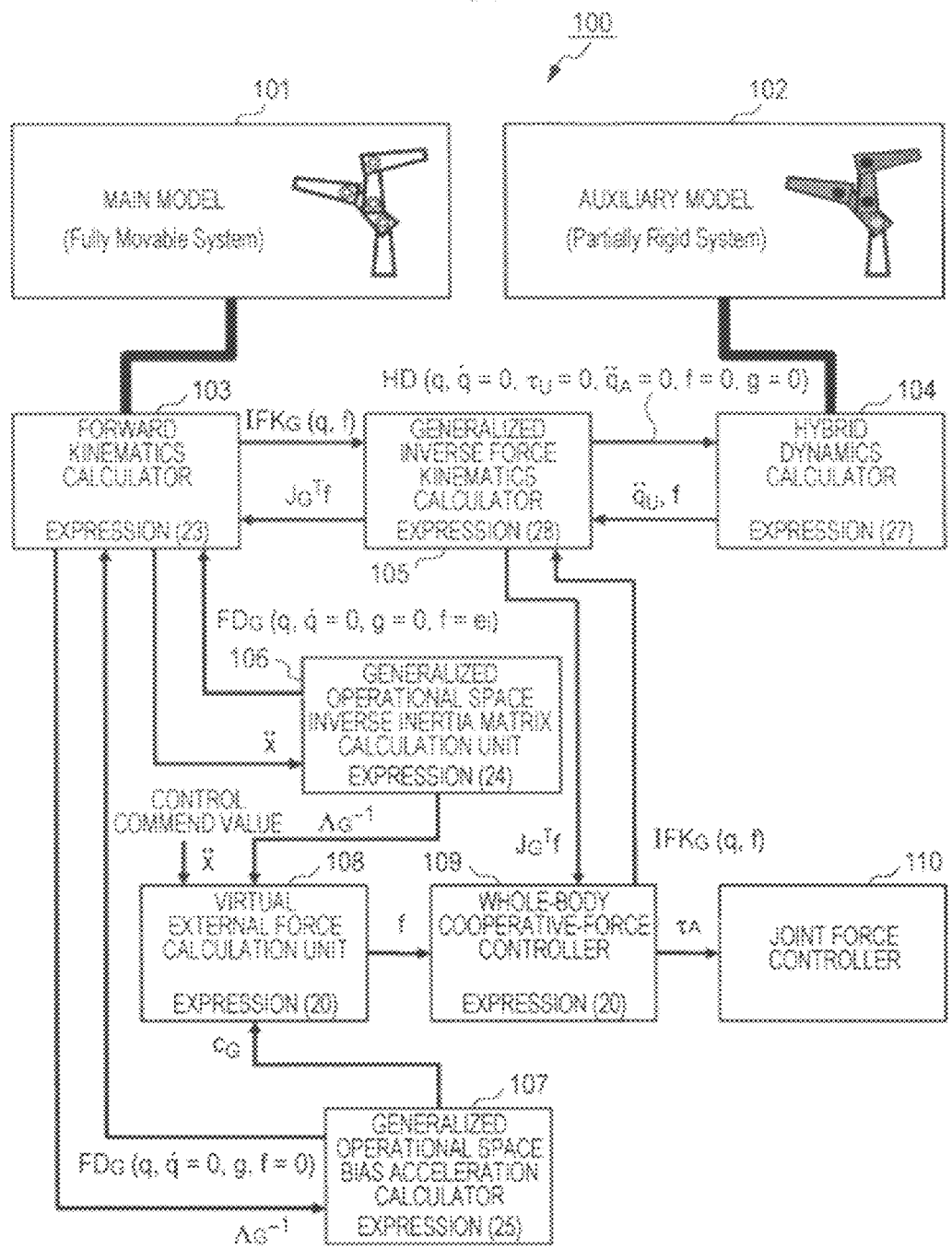
FIG. 2 is a drawing schematically illustrating a configuration example of a control system of the robot having unactuated joints using a main model and an auxiliary model.

A configuration example of a control system of the robot that has unactuated joints using the main model and the auxiliary model is schematically illustrated in FIG. 2.

The control system 100 shown in FIG. 2 is configured of a main model (fully actuated system model) 101, an auxiliary model (partially rigid model) 102, a forward dynamics calculator (forward dynamics executor) 103, a hybrid dynamics calculator (hybrid dynamics executor) 104, a generalized inverse force kinematics calculator (generalized inverse force kinematics executor) 105, a generalized operational space inverse inertia matrix calculator 106, a generalized operational space bias acceleration calculator 107, a virtual external force calculation unit (linear complementary problem solver) 108, a whole-body cooperated-force controller 109 and a joint force controller 110.

The main model 101 is the kinematics model of the robot where all joints are movable joints. Meanwhile, the auxiliary model 102 is the kinematics model of the robot where the actuated joint is an immovable joint and the unactuated joint is a movable joint. In the auxiliary model 102, "1. the joint force is not generated at the unactuated joint $q_U$ (the joint force $\tau_U$ of the unactuated joint $q_U$ is known)", "2. the actuated joint $q_A$ is immobile (the acceleration of the actuated joint $q_A$ is known)" and "3. the speed of the joints q are all 0 and gravity is not effected" (described above). A model that is shown at the center in FIG. 1 corresponds to the main model 101 and a model that is shown at the right in FIG. 1 corresponds to the auxiliary model 102.

The hybrid dynamics calculator 104 performs the mixed calculation expression (27) of the above-described inverse force kinematics and the forward dynamics using the auxiliary model 102, and is capable of calculating the joint force that acts on the joint where the joint acceleration is known and the joint acceleration that is generated at the joint where the joint force is known respectively.

The auxiliary model 102 is a system where the immovable joint that corresponds to the actuated joint and the movable joint that corresponds to the unactuated joint are mixed. As shown in the above expression (28-1), the actuated joint that is treated as the immovable joint means that the movement thereof does not occur and the joint acceleration is known, and the unactuated joint that is treated as the movable joint means that the joint force thereof does not generated and the joint force is known. In other words, the auxiliary model 102 is a system where the immovable joint where the joint acceleration is known and the movable joint where the joint force is known are mixed.

The generalized inverse force kinematics calculator 105 gives the condition that is illustrated in the above expression (28-1) to the hybrid dynamics calculator 104 and performs the above mixed calculation expression (27) so as to calculate the joint force $\tau_A$ that acts on the actuated joint $q_A$ that is the immovable joint on the auxiliary model 102 and the joint acceleration that is generated at the unactuated joint $q_U$ that is the movable joint respectively. Also, the generalized inverse force kinematics calculator 105 performs the generalized inverse force kinematics calculation (see the expression (18)) and then f is obtained from the joint force $\tau_A$.

The forward dynamics calculator 103 performs the forward dynamics calculation expression (23) regarding the operational space x using the main model 101 so as to obtain the acceleration that is generated in the operational space x. Here, note that the external force f is not converted to the joint force by the above expression (14) but converted to the joint force $\tau_A$ by the expression (18), which is different from the operational space physical amount calculation device that is disclosed in Japanese Unexamined Patent Application Publication No. 2007-108955 (described above). Thus, the forward dynamics calculator 103 gives the joint space q and external force f to the generalized inverse force kinematics calculator 105 ($IFK_G(q,f)$) so as to perform the forward dynamics calculation expression (23) using the joint force $\tau_A$ (=$J_G^T f$) of the actuated joint that is obtained by the generalized inverse force kinematics calculator 105.

The generalized operational space inverse inertia matrix calculator 106 repeatedly performs the forward dynamics calculation $FD_G$ based on the condition of the above expression (24) so as to calculate the generalized operational space inverse inertia matrix $\Lambda_G^{-1}$ that is illustrated in the above expression (21). Specifically, the generalized operational space inverse inertia matrix calculator 106 repeatedly performs the calculation of the above expression (23) at the forward dynamics calculator 103 so as to obtain components of all columns of the generalized operational space inverse inertia matrix $\Lambda_G^{-1}$, under the constraint where the parameters except the joint space q and the external force f are all 0 with respect to the forward dynamics calculator 103 furthermore, under conditions where $f=e_i$, in other words, the unit force acts only at the $i^{th}$ operational space.

The generalized operational space bias acceleration calculator 107 performs only one the forward dynamics calculation $FD_G$ based on the condition of the above expression (25) so as to calculate the generalized operational space bias acceleration $c_G$. Specifically, the generalized operational space bias acceleration calculator 107 performs only once the calculation of the above expression (23) at the forward dynamics calculator 103 so as to calculate the generalized operational space bias acceleration $c_G$, under the constraint where only gravity g and speed of the input parameters, which are generated at the joint space q with respect to the forward dynamics calculator 103 act.

The virtual external force calculation unit 108 solves the virtual external force f that is generated in the operational space x to achieve the known target acceleration that is generated in the operational space x in the relation expression (20) between the force and the acceleration that act in the operational space x that is expressed using the generalized operational space inverse inertia matrix $\Lambda_G^{-1}$ and the generalized operational space bias acceleration $c_c$. Here, the known target acceleration is a control command value that is input into the virtual external force calculation unit 108 from the outside (impedance controller or the like). For example, the virtual external force calculation unit 108 is treated as the above expression (20) and the linear complementary problem (LCP) that is configured of the inequality constraint condition that is formed between each of the links of the robot and between the link and the environment, and is capable of stably obtaining the external force f using the LCP solver in order to realize the target value of the acceleration that is generated in the operational space x (described above).

A whole-body cooperated-force controller 109 converts the virtual external force f that is obtained at the virtual external force calculation unit 108 to the actuated joint force $\tau_A$ of the actuated joint using the generalized inverse force kinematics calculation that is illustrated in the above expression (18) and calculates as the control target value of the joint force controller 110.

The joint force controller 110 controls the joint force of each actuated joint of the robot so as to realize the control target value of each joint, which is formed by the whole-body cooperated-force controller 109. In order to control the joint force precisely, for example, the actuator control device that performs the force control may be applied, which is disclosed in Japanese Unexamined Patent Application Publication No. 2009-269102 that has been assigned to the applicant. In addition, in order to precisely measure the torque that is applied to the actuator, the above-described actuator control device may apply the torque-measuring device that is disclosed in Japanese Unexamined Patent Application Publication No. 2009-288198 that has been assigned to the applicant.

Figure 3:
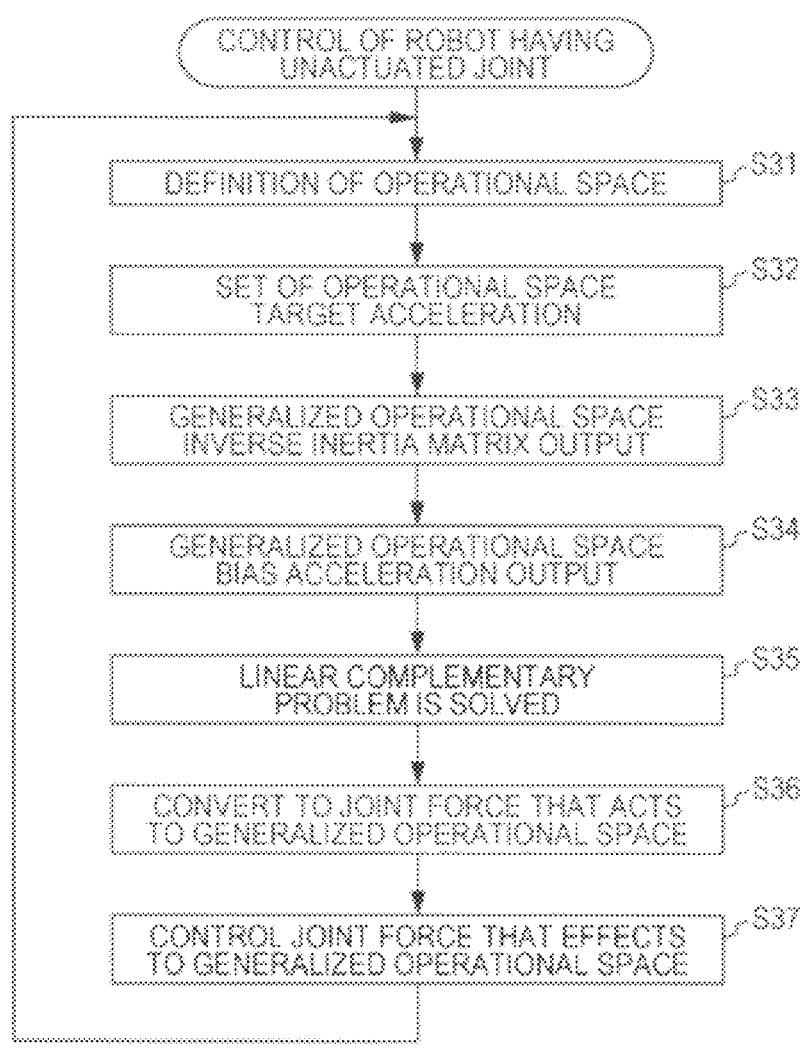
FIG. 3 is a flowchart illustrating a process sequence that is performed at the control system of the robot shown in FIG. 2.

A process sequence that is performed in the control system of the robot shown in FIG. 2 is illustrated in flowchart form in FIG. 3.

First of all, the operational space x that corresponds to the generalized Jacobian $J_G$ that is illustrated in the above expression (3) is defined (step S31). In other words, the motion space that controls the acceleration generated at an arbitrary portion of the robot is defined. For example, when the position of the hand tip of the robot is controlled, the position of the hand tip link and the hand tip that is seen from the coordinate system are designated.

Next, the target acceleration that is generated in the operational space x is set (step S32). In other words, the left side of the above expression (20) that illustrates the dynamics of the operational space x is given. If the target value of the acceleration of the operational space x may be designated, the speed and the position may be also designated. For example, if it is desired to control the speed of the operational space x, the target value of the acceleration may be designated from the target value of the speed as illustrated in the following expression (39-1) and if it is desired to control the position of the operational space x, the target value of the acceleration may be designated from the target value of the position as illustrated in the following expression (39-2). $K_v$ and $K_p$ are a speed gain and a position gain respectively.

$$\ddot{x}=K_v(\bar{\dot{x}}-\dot{x}) \qquad (39\text{-}1)$$

$$\ddot{x}=K_p(\bar{x}-x)-K_v(\dot{x}) \qquad (39\text{-}2)$$

Next, the generalized operational space inverse inertia matrix $\Lambda_G^{-1}$ (see the expression (21)) is calculated by the generalized operational space inverse inertia matrix calculator 106 (step S33).

Next, the generalized operational space bias acceleration $c_G$ is calculated by the generalized operational space bias acceleration calculator 107 (step S34).

Next, the virtual external force calculation unit 108 solves the virtual external force f that is exerted in the operational space x in order to achieve the target acceleration that is set in step S32 from the above expression (20) using the generalized operational space inverse inertia matrix $\Lambda_G^{-1}$ and the generalized operational space bias acceleration $c_G$ that are obtained in the precedent steps S33 and S34 (step S35). In the embodiment, the virtual external force calculation unit 108 solves the linear complementary problem that is configured of the above relation expression (37) and the inequality constraint condition expression (38) that is formed between each of the links of the robot and between the link and the environment, using the LCP solver and then obtains the virtual external force f that satisfies the constraint expressions (37) to (38).

Next, the whole-body cooperated-force controller 109 converts the virtual external force f that is obtained at the precedent step S35 to the actuated joint force $\tau_A$ of the actuated joint using the generalized inverse force kinematics calculation that is illustrated in the above expression (18) (step S36).

Thus, the joint force controller 110 controls the joint force of each actuated joint of the robot so as to realize the control target value of each joint, which is the joint force $\tau_A$ that is obtained in the precedent step S36 (step S37).

The process sequence that is illustrated in FIG. 3 is performed with for example, 1 KHz of a control frequency at the control system 100 of the robot shown in FIG. 2.

Figure 4:
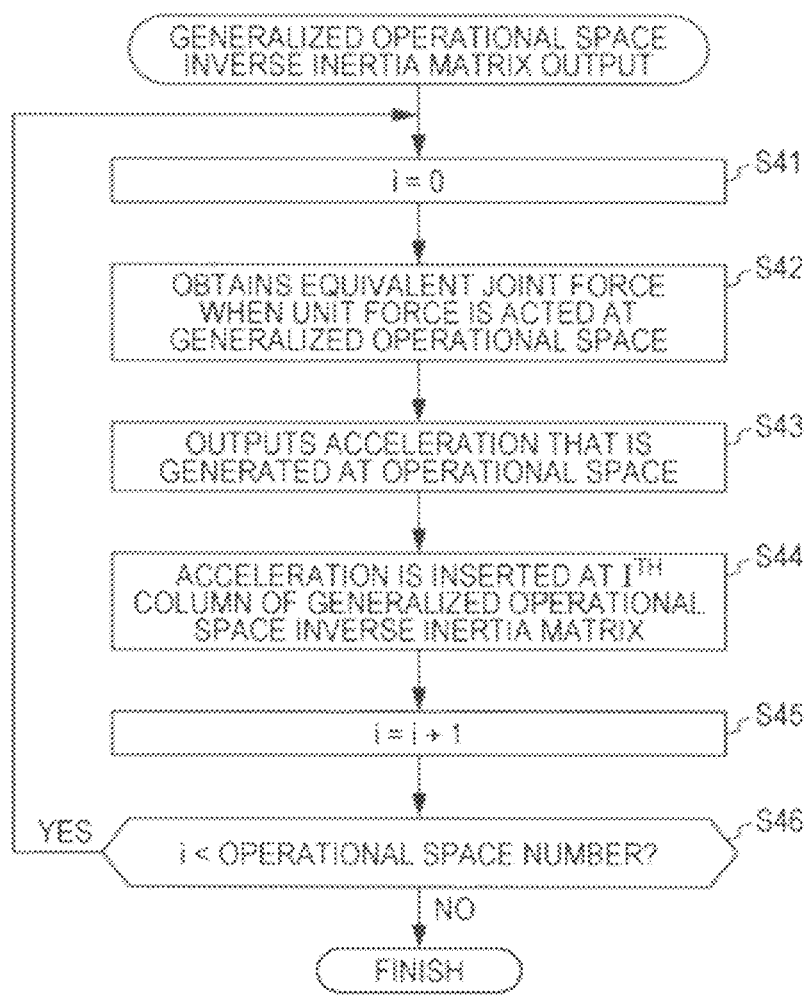
FIG. 4 is a flowchart illustrating a process sequence in order to calculate a generalized operational space inverse inertia matrix $\Lambda_G^{-1}$ from a generalized operational space inverse inertia matrix calculator.

A process sequence that calculates the generalized operational space inverse inertia matrix $\Lambda_G^{-1}$ by the generalized operational space inverse inertia matrix calculator 106 at the step S33 in the flowchart shown in FIG. 3 is illustrated in flowchart form in FIG. 4.

First of all, the generalized operational space inverse inertia matrix calculator 106 sets the column index i into the initial value 0 (step S41).

Next, the generalized inverse force kinematics calculator 105 obtains the equivalent joint force $\tau_A$ that is generated at the actuated joint space $q_A$ under the constraint where parameters except the joint space q and the external force f are all 0, furthermore under condition where $f=e_i$, in other words, the unit force acts only at the $i^{th}$ operational space (step S42).

Next, the forward dynamics calculator 103 performs the forward dynamics calculation expression (23) using the joint force $\tau_A (=J_G^T f)$ of the actuated joint, which is obtained by the generalized inverse force kinematics calculator 105 and then obtains the acceleration that is generated at all operational spaces (step S43). In other words, the forward dynamics calculator 103 performs the above expression (24).

Next, the generalized operational space inverse inertia matrix calculator 106 substitutes the acceleration that is obtained as described above into the $i^{th}$ column of the generalized operational space inverse inertia matrix $\Lambda_G^{-1}$ (step S44).

Thus, the generalized operational space inverse inertia matrix calculator 106 performs an increment of the column index i as much as 1 (step S45) and repeatedly performs the process routine of steps S42 to S45 until i reaches at the number of the operational space (No at step S46). Accordingly, the generalized operational space inverse inertia matrix calculator 106 is capable of obtaining whole of the generalized operational space inverse inertia matrix $\Lambda_G^{-1}$.

Figure 5:
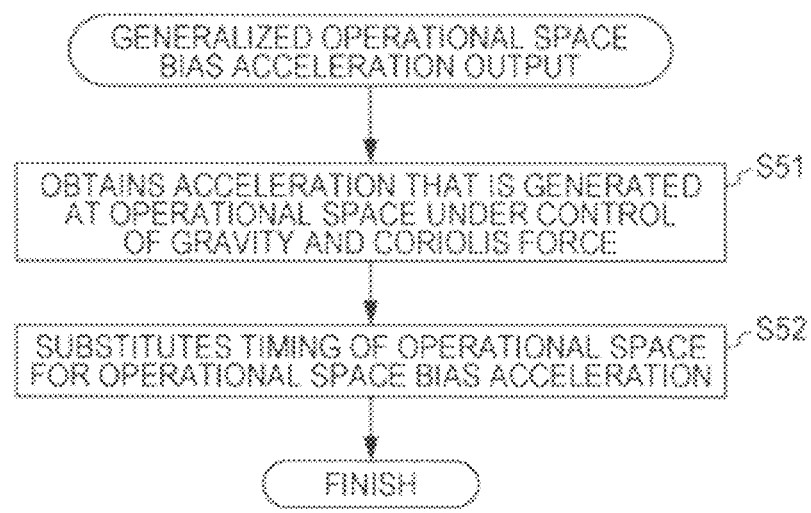
FIG. 5 is a flowchart illustrating a process sequence in order to calculate a generalized operational space bias acceleration $c_G$ from a generalized operational space inverse inertia matrix calculator.

A process sequence that calculates the generalized operational space bias acceleration $c_G$ by the generalized operational space bias acceleration calculator 107 at the step S34 in the flowchart shown in FIG. 3 is illustrated in flowchart form in FIG. 5.

The generalized operational space bias acceleration calculator 107 performs only once the forward dynamics calculation $FD_G$ of the above expression (24) under the constraint where only the speed and gravity g that are generated at the joint space q act and then calculates the generalized operational space bias acceleration $c_G$ illustrated in the above expression (22) as illustrated in the above expression (25) (step S51).

Thus, the generalized operational space bias acceleration calculator 107 substitutes the generalized operational space bias acceleration $c_G$ that is obtained into the above expression (20) that illustrates the dynamics of the operational space x (step S52).

Figure 6A:
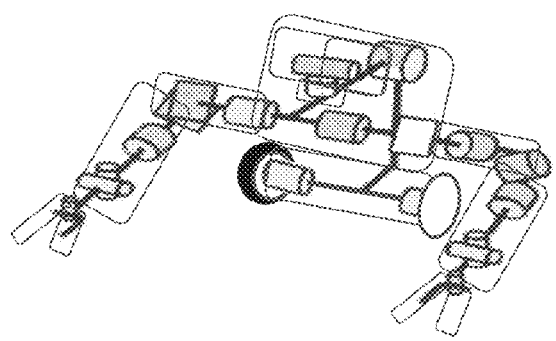
FIGS. 6A and 6B are drawings illustrating a configuration example of an inverted pendulum-type robot to which is applied the control system shown in FIGS. 1 to 3.

Herein below, an example where the control system shown in FIGS. 1 to 3 is applied to the inverted pendulum-type robot shown in FIG. 6A is described. The illustrated robot includes the right and the left arm portions having three degrees of freedom in the shoulder, two degrees of freedom in the elbow, two degrees of freedom in the wrist and one degree of freedom in the gripper. In addition, the above-described robot has two degrees of freedom in the head, one degree of freedom in the waist and two opposed wheels. The above-described robot has no point contacting the ground except the wheels.

A torque measuring device that is disclosed in for example, Japanese Unexamined Patent Application Publication No. 2009-288198 is loaded at each joint of the robot shown in FIG. 6A and then precise torque control may be performed. The torque controls are performed respectively at a plurality of satellite CPUs (Central Processing Unit) that is distributed and arranged in the body of the robot and each satellite CPU communicates to a central CPU through a real time LAN (Local Area Network). In addition, an IMU (Inertia Measurement Unit) is loaded at the machine body of the robot and a posture calculation is performed using a Kalman filter. The calculation value is also transported to the central CPU through the real time LAN.

Figure 6B:
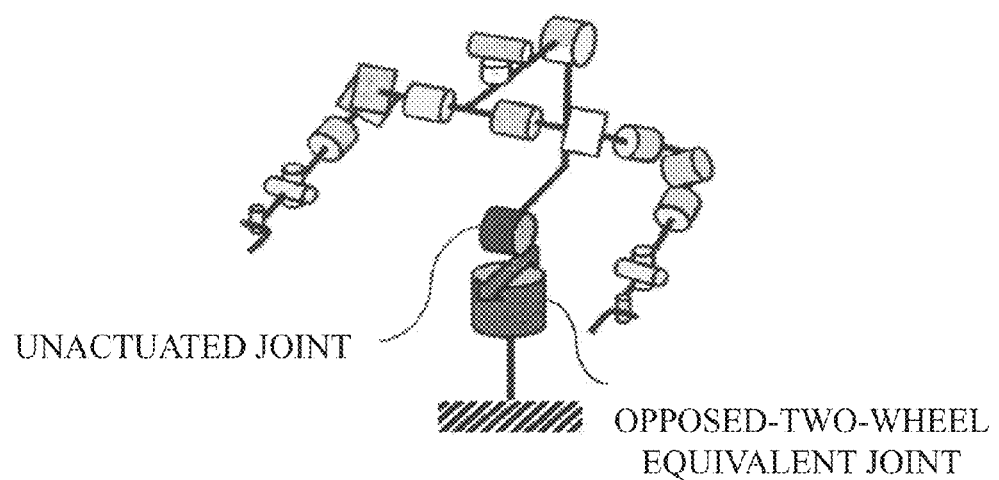
Figure 6C:
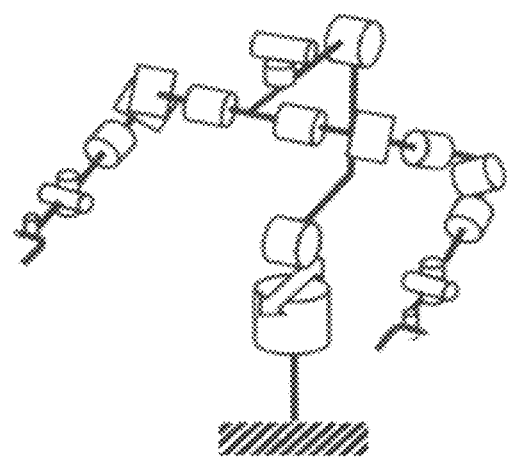
FIG. 6C is a drawing illustrating a main model in which all joints of the inverted pendulum-type robot shown in FIG. 6B are movable.
Figure 6D:
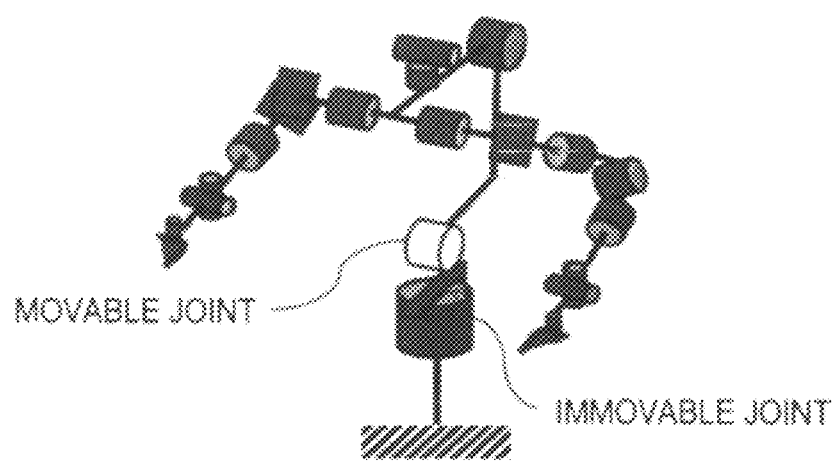
FIG. 6D is a drawing illustrating an auxiliary model in which actuated joints of the inverted pendulum-type robot shown in FIG. 6B are immovable and unactuated joints are movable.

The two opposing wheel equivalent model where the two opposing wheel type moving robot that is the same as that shown in FIG. 6A is expressed as a branched manipulator is disclosed in Japanese Unexamined Patent Application Publication No. 2010-188471 that has been assigned to the applicant. As shown in FIG. 6B, one unactuated joint that is continued to the two opposing wheel equivalent joint is inserted and expressed so that the entire robot is modeled as a two wheeled robot of the inverted pendulum-type. The main model where all joints of the inverted pendulum-type robot shown in FIG. 6B are movable is illustrated in FIG. 6C. In addition, the auxiliary model where the actuated joints of the inverted pendulum-type robot shown in FIG. 6B are immovable and the unactuated joints are movable is illustrated in FIG. 6D.

Figure 7:
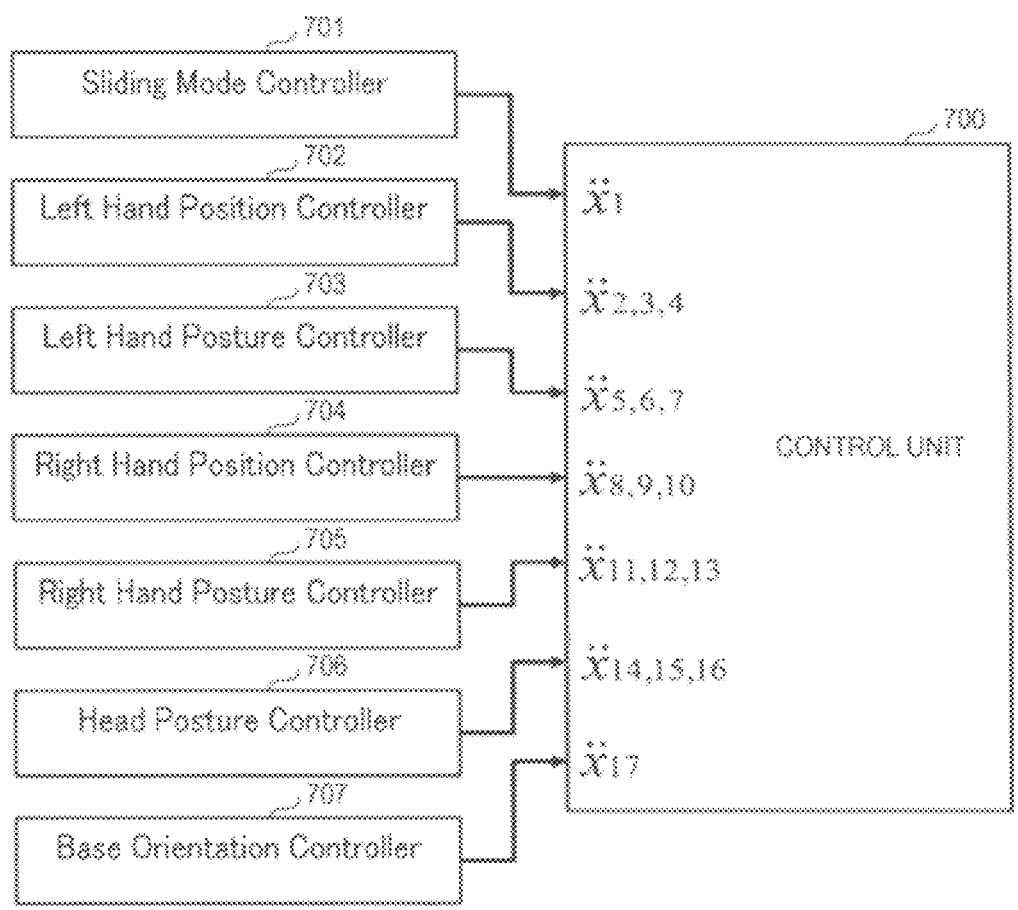
FIG. 7 is a drawing illustrating a configuration example of a control system in which the balance of the robot shown in FIGS. 6A to 6D is maintained while the position or the posture (an orientation) of a predetermined portion of a machine body is constantly maintained.

A configuration example of the control system where the balance of the robot shown in FIGS. 6A to 6D is maintained while the position or the posture (an orientation) of predetermined portion of the machine body is maintained constantly is illustrated in FIG. 7. As shown in the drawing, the acceleration target values with respect to all kinds of portions are input into a control unit 700. The control unit 700 performs the process sequence shown in FIGS. 3 to 5 and obtains the joint force $\tau_A$ of the actuated joint space $q_A$ in order to realize the acceleration target value with respect to each of the portions. Thus, the control unit 700 controls the torque of each actuated joint of the robot using the joint force $\tau_A$ so that the objects of the motions of all portions may be satisfied simultaneously.

A sliding mode control system (sliding mode controller) 701 is configured individually in order to maintain the balance of the robot shown in FIGS. 6A to 6D. The control unit 70 obtains the acceleration target value of the front and rear direction $x_1$ as the output of sliding mode control system.

In addition, the control system (simple PD control) where the position and the posture of the right and left grippers are maintained in constant within the global coordinate is configured of a left hand position controller 702, a left hand posture controller 703, a right hand position controller 704 and a right hand posture controller 705. The control unit 700 obtains the acceleration target value of a translation xyz direction $x_{2,3,4}$, $x_{8,9,10}$ and the acceleration target value of a rotation xyz direction $x_{5,6,7}$, $x_{11,12,13}$ respectively from each control system. Also, regarding the posture of the head and the orientation of the base, the control system is configured of a head posture controller 706 and a base orientation controller 707. The control unit 700 obtains the acceleration target value of the rotation xyz direction $x_{14,15,16}$ of the head and the orientation $x_{17}$ of the base from each control system.

When each of the acceleration target values is input from each control system, the control unit 700 performs the process sequence shown in FIGS. 3 to 5 and then obtains the joint force $\tau_A$ of the actuated joint space $q_A$ in order to realize the acceleration target value with respect to each portion. Thus, the control unit 700 controls the torque of each actuated joint of the robot using the joint force $\tau_A$ so that the objects of the motions of whole portions may be satisfied simultaneously.

Figure 8A:
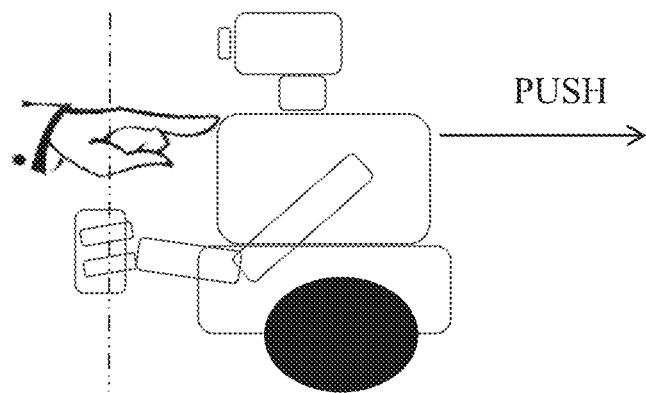
FIGS. 8A to 8C are drawings illustrating a state in which the robot that grips a glass of wine with the gripper holds the glass of wine without spilling a drop even though an external force is applied.
Figure 8B:
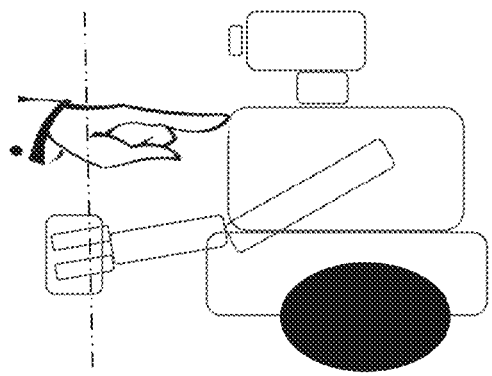
Figure 8C:
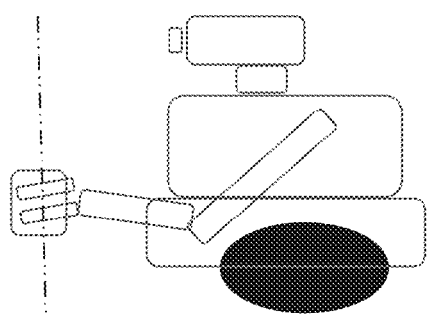

A state where the robot that grips a full glass of wine with the gripper of the left hand holds the glass of wine without spilling a drop even though an external force is applied as a push in the front and rear direction or a twist in right and left direction is illustrated in FIGS. 8A to 8C.

Figure 9:
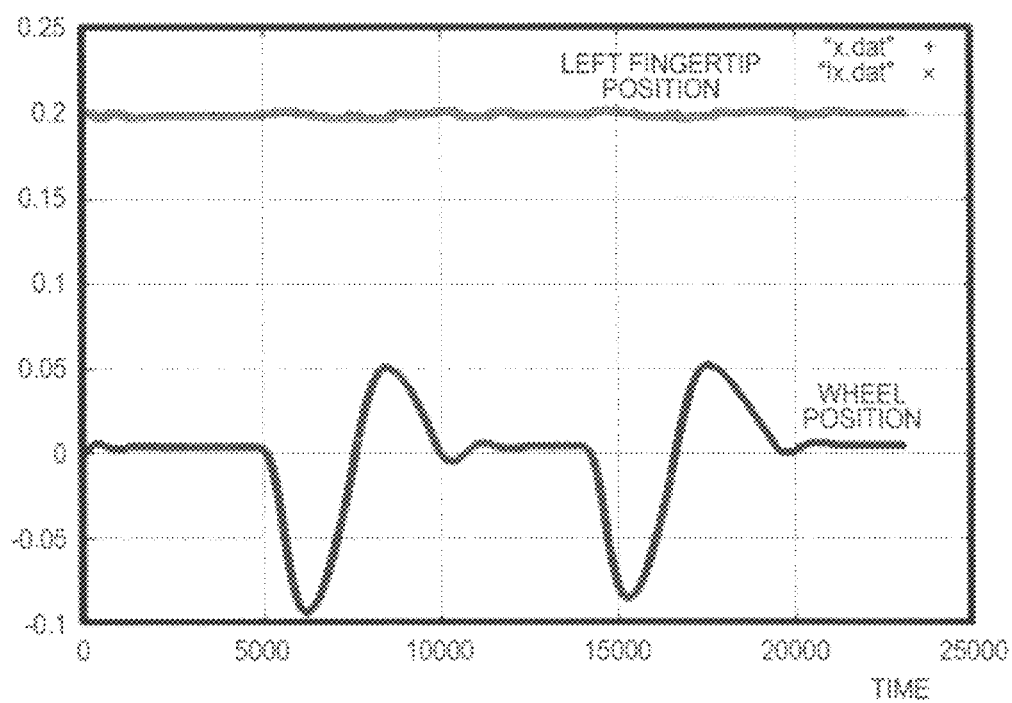
FIG. 9 is a drawing illustrating front and rear positions of wheels and the position of tip of the left hand when the robot is pushed towards the rear.
Figure 10:
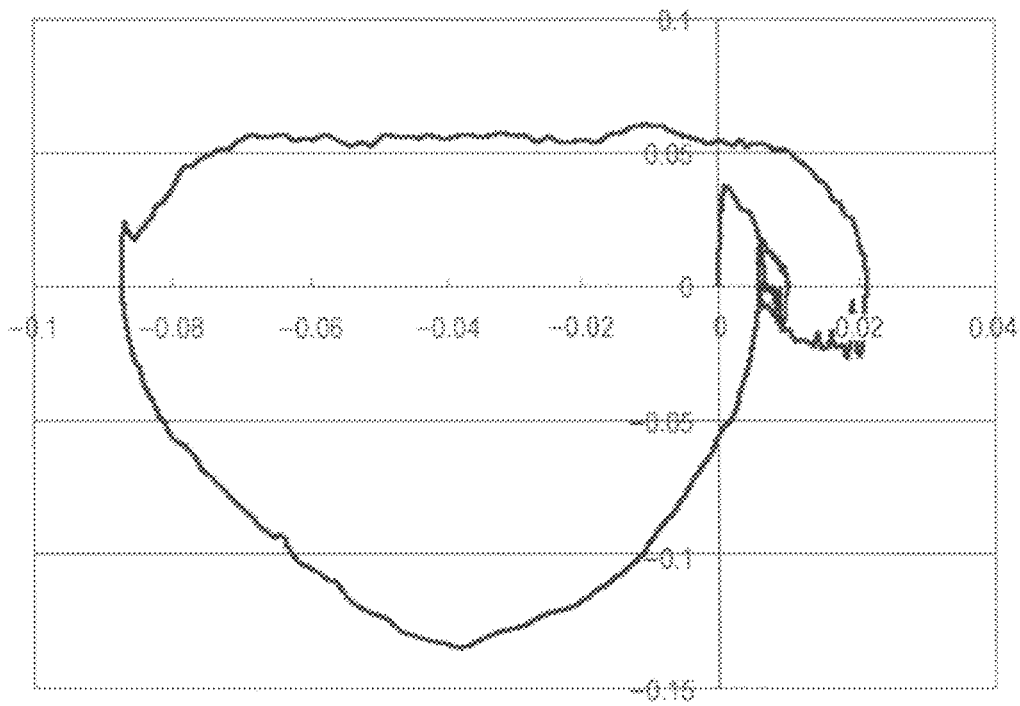
FIG. 10 is a drawing illustrating a change (change of a position and a speed) of the center of gravity of the robot on a phase plane when the robot is pushed towards the rear.

When the robot is pushed in the rear direction, the front and rear position of the wheel and the position of the left hand tip are illustrated respectively in FIG. 9. In addition, when the robot is pushed in the rear direction, a change (change of the position and the speed) of the center of gravity of the robot on a phase plane is illustrated in FIG. 10. From these drawings, the robot maintains the position of the tip of the left hand constant even though an external force is applied or the wheel position is moved in the front and rear direction. In other words, it can be understood that the balance is maintained while the position and the posture of the tip of the hand is maintained.

As described above, the joint force $\tau_A$ is obtained by the force f using the generalized Jacobian $J_G$ according to the generalized inverse force kinematics expressed in the above expression (18). As another application of the generalized inverse force kinematics, it may be used to rapidly calculate the generalized Jacobian $J_G$ when the inverse force kinematics calculation is performed using the above expression (6). Specifically, above-described generalized inverse force kinematics calculation expression (18) is expressed as the following expression (40).

$$\tau_A = J_G^T f = \text{IFK}_G(f) \tag{40}$$

Thus, the hybrid dynamics calculator 104 sets all the variables other than the joint space q and the external force f are to 0, and an external force composed of the $i^{th}$ component of one unit vector $e_i$ acts only at $i^{th}$ operational space.

The $i^{th}$ column of the matrix $J_G$ is expressed as the following expression:

$$J_G = \text{IFK}_G(e_i) \tag{41}$$

In addition, under the effective control of the external force f, the hybrid dynamics calculation that calculates the joint force of the actuated joint space is performed repeatedly for the number of the operational space so that whole of the generalized Jacobian $J_G$ may be obtained. Since the above expression (40) may be obtained by the calculation amount of O(N), the generalized Jacobian $J_G$ may be also obtained by the calculation amount of O(N).

The present disclosure contains subject matter related to that disclosed in Japanese Priority Patent Application JP 2010-231640 filed in the Japan Patent Office on Oct. 14, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A control device for a robot comprising:
 a hybrid dynamics calculator calculating joint forces that act on immovable joints where joint accelerations are known and the joint accelerations that are generated at movable joints where the joint forces are known by performing a hybrid dynamics calculation that includes inverse dynamics and forward dynamics using an auxiliary model in which the actuated joints of the robot having actuated joints and unactuated joints are immovable;
 a forward dynamics calculator calculating the accelerations that are generated by the known forces that act on the robot using a main model in which all joints of the robot are movable;
 a joint force determination unit determining the joint force for generating desired target acceleration at an arbitrary portion of the robot based on a calculation result from the hybrid dynamics calculator and the forward dynamics calculator; and
 a joint force controller setting the determined joint force as the control target value and controlling a joint force of each joint of the robot, wherein the joint force determination unit includes:
  a generalized operational space inverse inertia matrix calculator obtaining a generalized operational space inverse inertia matrix by repeatedly performing the forward dynamics calculation for all operational spaces by the forward dynamics calculator under conditions where all variables other than a joint space and a external force are 0 and the external force which is formed of one unit vector $e_i$ is acted to only the $i^{th}$ operational space by an $i^{th}$ component;
  a generalized operational space bias acceleration calculator obtaining a generalized operational space bias acceleration by performing the forward dynamics calculation by the forward dynamics calculator only once under a first constraint in which only speed and gravity that are generated at joint spaces act;
  a virtual external force calculation unit resolving a virtual external force f that is exerted in the $i^{th}$ operational space in order to obtain the desired target acceleration that is known and generated in the $i^{th}$ operational space in a relation expression of force and acceleration that act in the $i^{th}$ operational space that is expressed using the generalized operational space inverse inertia matrix and the generalized operational space bias acceleration; and
  a joint calculation unit converting the virtual external force f that is obtained by the virtual external force calculation unit to an actuated joint force of the actuated joints using a generalized inverse force dynamics calculation.

2. The control device for a robot according to claim 1, wherein the joint forces that act on the robot, which is obtained by the hybrid dynamics calculator is converted to the actuated joint force using a generalized Jacobian.

3. The control device for a robot according to claim 1, wherein the virtual external force calculation unit obtains the virtual external force f satisfying a linear complementary problem that is configured based on a second constraint formed between the relation expression, the robot and an environment using the generalized operational space inverse inertia matrix and the generalized operational space bias acceleration calculator to determine the joint force of the each joint of the robot based on the actuated joint force.

4. The control device for a robot according to claim 1, wherein a generalized Jacobian is obtained by repeatedly performing the hybrid dynamics calculation that calculates the actuated joint force of the joint space by the hybrid dynamics calculator wherein the joint space is an actuated joint space.

5. A computer program that is recorded in a non-transitory computer readable medium, which performs a process for controlling a robot on the computer, the computer functioning as, a hybrid dynamics calculator calculating joint forces that act on actuated joints of the robot where known joint accelerations are generated at unactuated joints of the robot, wherein the actuated joints and the unactuated joints are modeled as movable, wherein the joint forces are calculated using an auxiliary model in which the actuated joints of the robot are modeled as immovable and the unactuated joints of the robot are modeled as movable;

a forward dynamics calculator calculating joint accelerations that are generated by known forces that act on the robot using a main model in which all the actuated joints and the unactuated joints of the robot are modeled as movable;

a joint force determination unit determining a joint force for generating desired target acceleration at an arbitrary portion of the robot based on a calculation result from the hybrid dynamics calculator and the forward dynamics calculator; and a joint force controller setting the determined joint force as the control target value and controlling joint force of each joint of the robot.

6. A control method of a robot comprising:

calculating joint forces acting on actuated joints of the robot where known joint accelerations are generated at unactuated joints of the robot, wherein the actuated joints and the unactuated joints are modeled as movable, wherein the joint forces are calculated using an auxiliary model in which the actuated joints of the robot are modeled as immovable and the unactuated joints of the robot are modeled as movable;

calculating joint accelerations generated by known forces that act on the robot using a main model in which all the actuated joints and the unactuated joints of the robot are modeled as movable;

determining a joint force for generating desired target acceleration at an arbitrary portion of the robot based on the calculating of the joint forces and the calculating of the joint accelerations; and setting the determined joint force as the control target value and controlling a joint force of each joint of the robot.

7. The control method of claim 6, further comprising obtaining a generalized operational space inverse inertia matrix by repeatedly performing the calculation of the joint accelerations for all operational spaces under a condition where all variables other than a joint space and a external force associated with an operational space for which the calculation of the joint accelerations is being performed are 0, wherein the external force is formed of one unit vector acted to only the operational space by a component associated with the operational space.

8. The control method of claim 6, further comprising obtaining a generalized operational space bias acceleration by performing the calculation of the joint accelerations only once under a constraint in which only speed and gravity that are generated at joint spaces act.

9. The control method of claim 6, further comprising resolving a virtual external force that is exerted in an operational space in order to obtain the desired target acceleration that is known and generated in an operational space in a relation expression of force and acceleration that act in the operational space that is expressed using a generalized operational space inverse inertia matrix and a generalized operational space bias acceleration.

10. The control method of claim 9, wherein the virtual external force is obtained by satisfying a linear complementary problem that is configured based on a constraint formed between the relation expression, the robot and an environment using a generalized operational space inverse inertia matrix and a generalized operational space bias acceleration to determine the joint force of the each joint of the robot based on the obtained virtual external force.

11. The control method of claim 6, wherein the joint forces are calculated by performing a dynamic calculation that comprises inverse dynamics and forward dynamics using the auxiliary model.

* * * * *